United States Patent [19]

Hart

[11] 4,411,447
[45] Oct. 25, 1983

[54] VEHICLE SUSPENSION SYSTEM
[75] Inventor: Cullen P. Hart, Peoria, Ill.
[73] Assignee: Caterpillar Tractor Co., Peoria, Ill.
[21] Appl. No.: 317,709
[22] Filed: Nov. 2, 1981
[51] Int. Cl.³ .............................................. B60G 11/26
[52] U.S. Cl. .................... 280/714; 267/11 A
[58] Field of Search .............. 280/714, 772, 6 R, 6 H; 180/41; 267/11 R, 11 A

[56] References Cited
U.S. PATENT DOCUMENTS
3,953,040  4/1976  Unruh et al. ..................... 280/714

FOREIGN PATENT DOCUMENTS
795988  1/1981  U.S.S.R. ...................... 280/6 H

Primary Examiner—Joseph F. Peters, Jr.
Assistant Examiner—Ross Weaver
Attorney, Agent, or Firm—Wood, Dalton, Phillips, Mason & Rowe

[57] ABSTRACT

A vehicle suspension system wherein a frame (11) is supported on an axle (16) by a pair of fluid struts (19,20). The system includes a main accumulator (32) and a pair of auxiliary accumulators (30,35) which are fluidly interconnected. The left strut (19) is fluidly connected to the left auxiliary accumulator (30) and to the cylinder (42) of the main accumulator (32) to act on the pressure surface (62) of one of the pistons (46) therein. The righthand strut (20) is fluidly connected to the righthand auxiliary accumulator (35) and to a lower portion of the cylinder (42) of the main accumulator (32) so as to act on a pressure surface (63) of a second piston (47) therein. The pistons are interconnected in the main accumulator. Movement of the pistons (37,45,40) of the accumulators is resiliently resisted by the provision of compressed gas (38,48,41) in the respective accumulators. The main accumulator controls the bounce mode of the vehicle and the auxiliary accumulators control the roll mode thereof as a result of the arrangement. The suspension system, among other things, solves the vexatious problem of providing a soft suspension resistent to roll in off-highway vehicles having high centers of gravity and wide tires.

14 Claims, 5 Drawing Figures

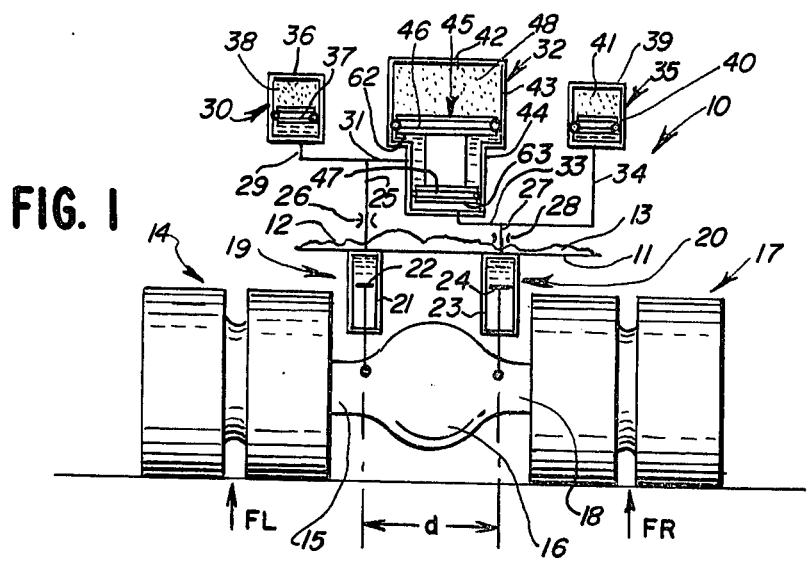
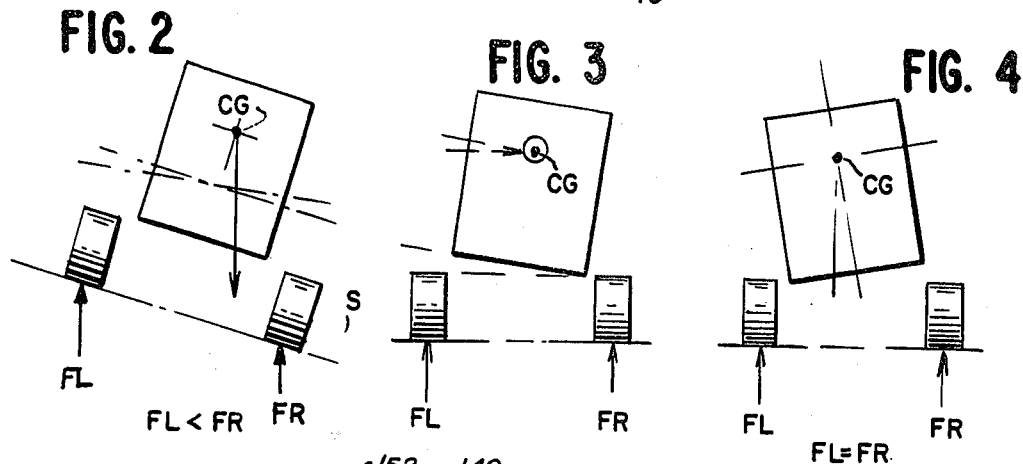
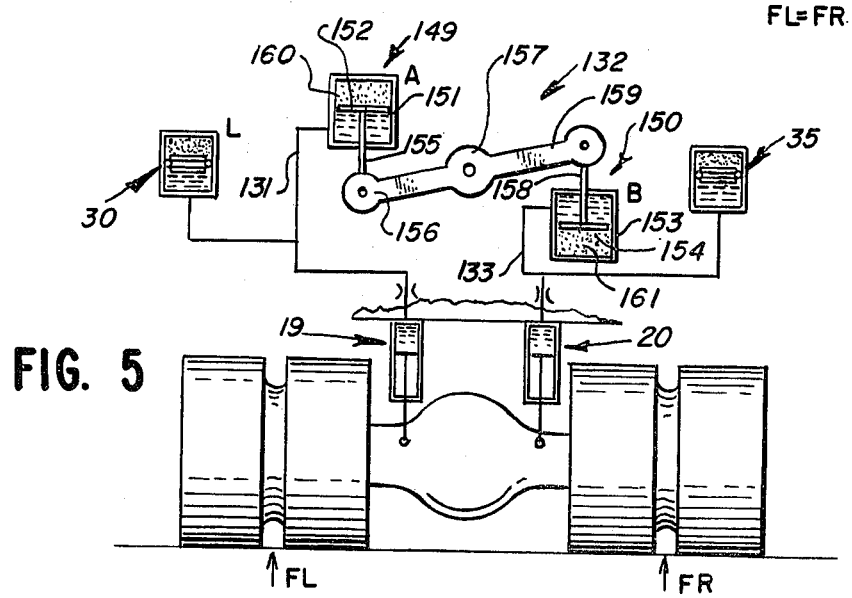

VEHICLE SUSPENSION SYSTEM

TECHNICAL FIELD

This invention relates to vehicles and in particular to hydraulic strut suspension systems for use in vehicles.

BACKGROUND ART

In the operation of wheeled vehicles, such as off-highway trucks, it is desirable to utilize a relatively low spring rate, soft suspension system. However, such soft suspension systems raise a serious problem in connection with the tendency of the vehicle to roll in a turn or on a slope.

Further, it is desirable to provide in such off-highway vehicles a relatively wide tire. On the rear axle, it is conventional to use a pair of tires on each side of the vehicle. Where such wide tires are utilized, the availability of space for mounting the suspension system struts therebetween is substantially reduced, requiring that the struts be disposed relatively closely together. Reduction in the spring rate of such a suspension system, as well as such juxtaposition of the struts, causes a substantial reduction in the roll resistance.

Conventionally, off-highway vehicles have relatively high centers of gravity. As a result of such reduction in the spring rate of the front struts, such vehicles tend to roll in a turn or on a side slope. As a result, they transfer greater loads to the outboard strut, causing the strut to contract and thus further aggravate the problem.

In U.S. Pat. No. 3,871,635 of Dale H. Unruh et al., which patent is owned by the assignee hereof, a suspension hydraulic roll stabilizer with leveling is disclosed. In that patent, the hydraulic struts are cross-connected across the vehicle, with each of the cross connections being provided with a gas-charged accumulator for providing a spring rate for each hydraulic system. Leveling is effected by selective transfer of hydraulic fluid between the otherwise cross-connected strut systems. The strut construction required a relativley large size to provide suitable strength for the load.

The present problem is directed to overcoming one or more of the problems set forth.

DISCLOSURE OF INVENTION

The present invention comprehends an improved vehicle suspension which is relatively soft in the bounce mode and relatively stiff in the roll mode.

The disclosed system utilizes a plurality of accumulators having different spring constants in a novel manner to provide the desired suspension control. The arrangement is extremely simple and economical of construction while yet providing the improved suspension characteristics.

In the illustrated embodiment, an accumulator means is provided having either a dual piston or a pair of interconnected pistons. A pair of smaller accumulators are interconnected with the main accumulator to the head end of the struts which are connected between the frame and axle of the vehicle on opposite sides thereof.

The auxiliary, smaller accumulators have a relatively high spring constant and are connected so as to provide high stiffness in the roll mode while being effectively inactive in the bounce mode.

In the bounce mode, the main accumulator provides a relatively soft suspension.

In the illustrated embodiments, the accumulators are provided with resilient movement resisting means and, more specifically in the illustrated embodiment, are provided with gas chambers permitting the enclosed gas therein to serve as a resilient spring means.

The difference in stiffness between the auxiliary accumulators and that of the main accumulator may be effected by providing the gas in the auxiliary accumulators at a relatively higher precharged pressure and/or the value of the gas in the auxiliary accumulators at a precharged volume smaller than that of the main accumulator.

More specifically, the invention is advantageously adapted for use in a vehicle having a frame provided with wheels carried on left and right portions of the rear axle. A left suspension strut having a hydraulic cylinder is provided with a movable piston, and one of these elements is fixedly associated with the axle left portion, the other of the elements being fixedly associated with the frame left portion. A right suspension strut having a hydraulic cylinder is provided with a movable piston. One of the right strut cylinder and piston means is fixedly associated with the axle right portion, and the other of these right strut elements is fixedly associated with the frame right portion. The struts cooperatively suspend the frame on the axle.

The invention includes improved means for controlling the movement of the strut pistons, including a main pressure accumulator structure having at least one pressure accumulator provided with first and second pistons defining respectively equal area first and second pressure surfaces, cylinders movably housing the pistons, and means for causing joint movement of the pistons in the cylinders. The accumulators further include elements for resisting the joint movement of the pistons, a left auxiliary pressure accumulator having a third piston and cylinder movably housing the third piston, and second resilient element for resisting movement of the third piston. The invention further includes a right auxiliary pressure accumulator having a fourth piston and cylinder movably housing the fourth piston, and third resilient element for resisting movement of the fourth piston. The structure further includes means hydraulically connecting the left strut cylinder with the main and left auxiliary accumulator cylinders to direct fluid pressure from the left strut cylinder against the first and third pistons. The structure still further includes means hydraulically connecting the right strut cylinder with the main and right auxiliary accumulator cylinders to direct fluid pressure from the right strut cylinder against the second and fourth pistons, the spring rate of the second and third resilient elements being greater than the spring rate of the first resilient element to provide a first suspension stiffness as an incident of a bounce of the wheels and a second, greater suspension stiffness as an incident of a tilt roll of the wheeled axle.

In one form, the piston means of the main pressure accumulator means comprises a single piston having a pair of pressure surfaces. In another form, the main pressure accumulator comprises a pair of cylinders each having an associated piston, with the pistons being mechanically interconnected for joint movement thereof.

BRIEF DESCRIPTION OF DRAWING

FIG. 1 is a schematic elevation illustrating the arrangement of a preferred form of vehicle suspension system showing the embodiment of the present invention;

FIG. 2 is a force diagram illustrating the arrangement of forces acting on the system when the vehicle is disposed on a slope;

FIG. 3 is a force diagram illustrating the arrangement of the forces during lefthand cornering of the vehicle;

FIG. 4 is a force diagram illustrating the arrangements during a righthand cornering of the vehicle; and FIG. 5 is a schematic elevation illustrating a modified form of vehicle suspension system showing another embodiment of the present invention.

BEST MODE FOR CARRYING OUT THE INVENTION

In the exemplary embodiment of the invention as disclosed in FIG. 1 of the drawing, a vehicle generally designated 10 is provided with a frame 11 having a left portion 12 and a right portion 13. A pair of left wheels 14 is carried on a left portion 15 of an axle 16, and a pair of right wheels 17 is carried on a right portion 18 of the axle.

A left suspension strut generally designated 19 is connected between left portion 15 of the axle and left portion 12 of the frame. A right suspension strut generally designated 20 is connected between the right portion 18 of axle 16 and right portion 13 of the frame 11.

Left suspension strut 19 defines a fluid cylinder 21 in which is movably mounted a fluid piston 22. Right suspension strut 20 defines a cylinder 23 in which is movably mounted a piston 24.

A conduit 25 is connected to the head end of cylinder 21 and is provided with a damping orifice 26. A conduit 27 is connected to the head end of cylinder 23 and is provided with a damping orifice 28. Conduit 25 is provided with branch conduits 29 leading to a first auxiliary accumulator 30, and branch conduit 31 leading to a main accumulator 32. Conduit 27 is provided with a first branch conduit 33 leading to the main accumulator 32, and a second branch conduit 34 leading to a second auxiliary accumulator 35.

Accumulator 30 includes a closed cylinder 36 enclosing a movable piston 37. Branch conduit 29 communicates with the lower end of the cylinder below piston 37 and the head end of the cylinder, above piston 37, is filled with a compressible fluid, such as gas 38. Auxiliary accumulator 35 similarly is defined by a closed cylinder 39 and a movable piston 40 therein. Branch conduit 34 communicates with the lower end of cylinder 39 below piston 40 and the head end of the cylinder is filled with a compressible fluid, such as gas 41.

In the embodiment of FIG. 1, the main accumulator is defined by a stepped cylinder 42 having a large diameter end portion 43 and a small diameter end portion 44. A piston means 45 is movably disposed in the cylinder and includes a first piston 46 received in the large diameter portion 43 of the cylinder, and a small piston 47 received in the small diameter portion 44 of the cylinder.

Branch line 33 of conduit 27 communicates with the lower end of cylinder portion 44 below piston 47 and branch line 31 of conduit 25 communicates with the portion of the cylinder below the upper piston 46. A resiliently compressible fluid, such as gas 48, is provided in the head end of the cylinder above piston 45.

Referring to the embodiment of FIG. 5, a modified form of suspension control system is shown to comprise a system generally similar to that of FIG. 1 but wherein the main accumulator means generally designated 132 is defined by a pair of separate piston-cylinder devices generally designated 149 and 150. Device 149 includes a cylinder 151 in which is movably received a piston 152 and device 150 is defined by a cylinder 153 in which is movably received a piston 154. Piston 152 is provided with a piston rod 155 which is connected to one end 156 of a pivotal rocker arm 157 and piston 154 is provided with a piston rod 158 connected to the opposite end 159 of the rocker arm 157. Thus, the pistons are mechanically interconnected for joint movement. The branch line 131 is connected to the cylinder 151 below the piston 152 and a resilient fluid in the form of a gas 160 is provided in the head end of cylinder 151 above piston 152. Branch conduit 133 is connected to the upper end of cylinder 153 above the piston 154 and the lower end of the cylinder is provided with a resilient fluid, such as gas 161.

The area of surface 62 of piston 46 is preferably equal to the area of lower surface 63 of lower piston 47 in main accumulator 32. Similarly, the areas of pistons 152 and 154 in accumulator devices 149 and 150 are preferably equal. Thus, the accumulator devices 149 and 150 function substantially similarly to accumulator means 32.

INDUSTRIAL APPLICABILITY

The vehicle suspension system of the present invention functions in a novel and simple manner. More specifically, when the vehicle bounces, hydraulic fluid is forced from each of the struts through the conduits 25 and 28 to the main accumulator 32. As the fluid delivered to the main accumulator is equally delivered to the surfaces 62 and 63, which as discussed above are of equal area, the hydraulic pressure acts equally on the piston 45 so as to compress the gas 48 which thus acts as a spring and shock absorber. The volume of gas 48 in cylinder portion 43 may be relatively large and the precharged pressure thereof may be relatively low so as to provide a relatively low spring constant in the soft bounce of the vehicle.

Thus, under normal circumstances, the axle 16 may move up and down parallel with the truck frame 11. When a force, such as force FR acting on the right wheels, becomes larger than the upward force FL acting on the left wheels, such as due to a bump in the road engaged by the right wheels only, a pothole in the road under the left wheels only, etc., the force is directed through the struts tending to cause the frame to roll correspondingly.

Under these circumstances, however, the pressure acting on surface 63 is greater than the pressure acting on surface 62. Since the pressure on surface 63 is acting alone against the precharge of gas 48 and cannot overcome that spring rate alone, the pressure is directed against the precharge of gas in auxiliary accumulator 35.

In the illustrated embodiment, the spring rate of the auxiliary accumulators 30 and 35 is made to be greater than the spring rate of the main accumulator 32. Illustratively, the precharge of the gas 38 and 41 may be set higher than the precharge of gas 48 in the main accumulator. The total volume of the gas 38 in accumulator 30 and gas 41 in accumulator 35 may be made smaller than the total volume of gas 48 in accumulator 32. As a result, the auxiliary accumulators are stiffer than the main accumulator and, thus, the system provides a greater stiffness relative to a rolling movement of the frame than to the bouncing movement thereof, as described above.

Thus, the main accumulator 32 acts as a relatively soft spring suspension for the vehicle in the bounce mode and the auxiliary accumulators 30 and 35 act as relatively stiff suspensions of the frame in the roll mode. This action is provided notwithstanding the relatively close spacing of the struts 19 and 20, as shown in FIG. 1, as may be necessitated by the use of the dual wheels on each end of the axle.

As the stiffness of the bounce controlling main accumulator 32 may be set for any value relative to the stiffness of the roll control auxiliary accumulators 30 and 35, the system is advantageously adapted for use with a wide range of vehicles, such as tractors and the like.

The system may be utilized with either the front or rear wheels of the vehicle. As illustrated in FIG. 2, the system functions similarly where the vehicle is riding in an inclined manner on a slope S, and as shown in FIGS. 3 and 4, the system functions to control the roll in right and left cornering of the vehicle.

The system, as shown in FIG. 5, functions substantially identically to the system of FIG. 1 except for the modified arrangement of the pistons of the accumulator devices 149 and 150 which move in opposite directions rather than in the same direction as a result of the rocker arm-type connection therebetween. However, in each case, the areas of the pistons are equal so that hydraulic liquid delivered to the piston chambers causes movement of the respective pistons in the same manner as in accumulator 32. As will be obvious to those skilled in the art, any method of interconnecting the pistons of the main accumulator means may be utilized within the scope of the invention.

The use of the improved suspension control permits the struts to be maintained relatively small while yet disposed in relatively close spacing. Thus, the invention is advantageously adapted for use with vehicles as shown in FIG. 1, wherein only a small amount of free space is available between the vehicle wheels.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a vehicle (10) having a frame (11), left (14) and right (17) wheels carried respectively on left (15) and right (18) portions of an axle (16), a left suspension strut (19) having fluid cylinder means (21) provided with a movable piston means (22), one of said means (21,22) being fixedly associated with said axle left portion (15) and the other of said means being fixedly associated with same frame, and a right suspension strut (20) having fluid cylinder means (23) provided with a movable piston means (24), one of said right strut means being fixedly associated with said axle right portion (18) and the other of said right strut means being fixedly associated with said frame (11), the improvement comprising:
   main pressure accumulator means (32,149) having at least one pressure accumulator having first (46,152) and second (47,154) movable piston means (21,22) defining respectively equal area first (62) and second (63) pressure surfaces, and means (45,157) causing joint movement of said piston means and first resilient means (48,160,161) for resisting said joint movement of the piston means;
   a left auxiliary pressure accumulator (30) having a third movable piston means (37) and second resilient means (38) for resisting movement of said third piston means;
   a right auxiliary pressure accumulator (35) having a fourth movable piston means (40) and third resilient means (41) for resisting movement of said fourth piston means (40);
   means (25,29,31,131) for fluidly connecting the left strut cylinder (21) with said main and left auxiliary pressure accumulator (32,149,30) to direct fluid pressure from said left strut cylinder means (21) against said first (46) and third (37) piston means; and
   means (27,33,34,133) fluidly connecting the right strut cylinder (23) with said main (43) and right (39) auxiliary pressure accumulator means (32,149,35) to direct fluid pressure from said right strut cylinder means (23) against said second (47) and fourth (40) piston means, the spring rate of said second (38) and third (41) resilient means being greater than the spring rate of said first (48) resilient means.

2. The vehicle suspension system of claim 1 wherein said main pressure accumulator piston means (46,47,152,154) are mechanically connected.

3. The vehicle suspension system of claim 1 wherein said first resilient means (48,160) acts directly on said first piston means (46,152).

4. The vehicle suspension system of claim 1 wherein damping means (26,28) are provide in said means fluidly connecting the struts (21,23) to said accumulators (32,149,30,35).

5. The vehicle suspension system of claim 1 wherein said resilient means (38,48,41,160,161) comprise compressible gas means.

6. The vehicle suspension system of claim 5 wherein said compressible gas means (38,48,41,160,161) each have a precharge pressure of the gas means in said auxiliary accumulator means (30,35) being greater than that in the main accumulator (43,151,153).

7. The vehicle suspension system of claim 5 wherein said compressible gas means (38,48,41,160,161) each have a precharge volume of the gas means in said auxiliary accumulator means (30,35) being less than that in the main accumulator means (32,149).

8. The vehicle suspension system of claim 1 wherein said main pressure accumulator means (132) comprises first (151) and second (153) cylinders, said first piston means (152) defining a first piston in said first cylinder (151), and said second piston means (154) defining a second piston in said second cylinder (153), and further including means (157) interconnecting said pistons for joint movement.

9. In a vehicle (10) having a frame (11), left (14) and right (17) wheels carried respectively on left (15) and right (18) portions of an axle (16), a left suspension strut (19) having a fluid cylinder means (21) connected to one of (a) a left portion (12) of the frame (11) or (b) the left portion (15) of the axle (16) and being provided with a movable piston means (22) connected to the other of said left portion (12) of the frame (11) or left portion (15) of axle (16), a right suspension strut (20) having a fluid cylinder means (23) connected to one of (a) a right portion (13) of the frame (11) or (b) the right portion (18) of the axle (16) and being provided with a movable piston means (24) connected to the other of said right portion (13) of the frame (11) or right portion (18) of the axle (16), said struts (19,20) cooperatively suspending the frame (11) in the axle (16), the improvement comprising:

> main pressure accumulator means (32) having a first piston means (45) defining first (62) and second (63) pressure surfaces;
> cylinder means (43) movably housing said piston (45);
> compressible gas means (48) in said accumulator cylinder means for resisting movement of the piston (45);
> a left auxiliary pressure accumulator (30) having a second piston means (37) and cylinder means (36) movably housing said second piston means, and compressible gas means (38) in said left auxiliary pressure accumulator cylinder means for resisting movement of said second piston means (37);
> a right auxiliary pressure accumulator (35) having a third piston means (40) and cylinder means (61) movably housing said third piston means, and compressible gas means (41) in said right auxiliary pressure accumulator cylinder means for resisting movement of said third piston means (40) therein;
> means (25,29,31) fluidly connecting the left strut cylinder means (21) with said main and left auxiliary accumulator cylinder means (43,36) to direct fluid pressure from said left strut cylinder against said first pressure surface (52) and third piston means (37); and
> means (27,33,34) fluidly connecting the right strut cylinder means (23) with said main and right auxiliary accumulator cylinder means (43,39) to direct fluid pressure from said right strut cylinder against said second pressure surface (63) and fourth piston means (40), the spring rate of said compressible gas (38,41) in said auxiliary pressure accumulators being greater than the spring rate of said compressible gas (48) in said main pressure accumulator to provide a first suspension stiffness as an incident of a bounce of said wheels (14,17), and a second, greater suspension stiffness as an incident of a tilt roll of the wheeled axle (16).

10. The vehicle suspension system of claim 9 wherein said first (62) and second (63) pressure surfaces have equal areas.

11. The vehicle suspension system of claim 9 wherein the precharge pressure of the gas means (38,41) in said auxiliary accumulator cylinders is higher than that of the gas means (48) in the main accumulator cylinder.

12. The vehicle suspension system of claim 9 wherein the precharge volume of the gas means (38,41) in said auxiliary accumulator cylinders is smaller than that of the gas means (48) in the main accumulator cylinder.

13. The vehicle suspension system of claim 9 wherein the precharge pressure of the gas means (38,41) in said auxiliary accumulator cylinders is higher than that of the gas means (48) in the main accumulator cylinder and the volume of the gas means (38,41) in said auxiliary accumulator cylinders is smaller than that of the gas means (48) in the main accumulator cylinder.

14. A suspension system for a vehicle (10) having an axle (16) and a frame (11), said axle (16) having left (15) and right (18) portions, comprising:

> a left strut (19) having a cylinder (21) and a piston (22), said cylinder (21) being connected to one of said frame (11) and said left portion (15) of said axle (16), said piston (22) being movably positioned in said cylinder (21) and connected to the other of said frame (11) and said left portion (15) of said axle (16);
> a right strut (20) having a cylinder (23) and a piston (24), said cylinder (28) being connected to one of said frame (11) and said right portion (18) of said axle (16), said piston (24) being movably positioned in said cylinder (23) and connected to the other of said frame (11) and said right portion (18) of said axle (16);
> a main accumulator (32,149) having first (46,152) and second (47,154) pistons, and a first fluid spring rate, said pistons (46,47;152,154) being movable one with the other;
> a left auxiliary accumulator (30) having a piston (37), a cylinder (36) and a second fluid spring rate, said second fluid spring rate being greater than about said first spring rate, said piston (37) being movably positioned in said cylinder (36), said cylinder (36) being positioned in fluid communication with said cylinder (21) of said left strut (19) and with said main accumulator (32,149) relative to said first piston (47,154) of said main accumulator (32,149); and
> a right auxiliary accumulator (35) having a piston (40), a cylinder (61) and a third spring rate, said third spring rate being greater than about said first spring rate, said piston (40) being movably positioned in fluid communication with said cylinder (28) of said right strut (20) and with said main accumulator (32,149) relative to said second piston (47,154) of said main accumulator (32,149).

* * * * *